MAGNETIC CORE SHIFT REGISTER COUNTER

Filed Oct. 8, 1954 2 Sheets-Sheet 1

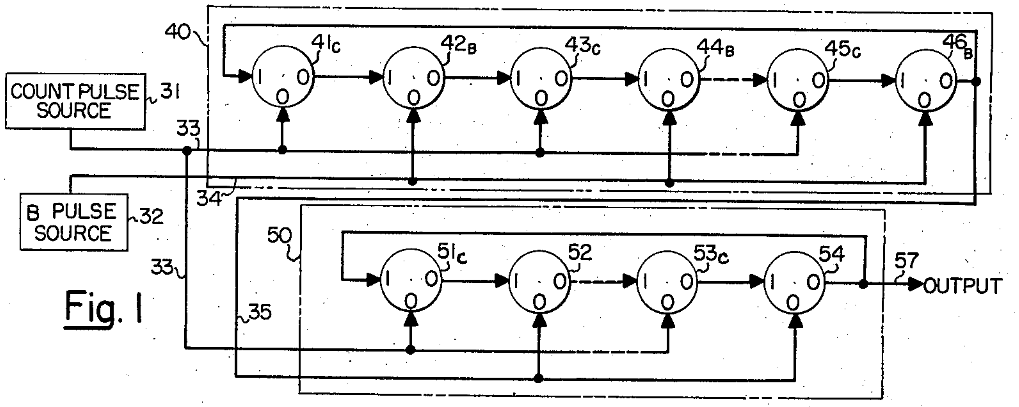

Fig. 1

Fig. 2

| COUNT | SHIFT PULSES | COUNTER 40 | | | | | | COUNTER 50 | | | |
|---|---|---|---|---|---|---|---|---|---|---|---|
| | | MAGNETIC CORE STORAGE ELEMENTS → | | | | | | | | | |
| | | $41_C$ | $42_B$ | $43_C$ | $44_B$ | $45_C$ | $46_B$ | $51_C$ | 52 | $53_C$ | 54 |
| 0 | B | 1 | 0 | 0 | 0 | 0 | 0 | 1 | 0 | 0 | 0 |
| 1 | COUNT | 0 | 1 | 0 | 0 | 0 | 0 | 0 | 1 | 0 | 0 |
| | B | 0 | 0 | 1 | 0 | 0 | 0 | 0 | 1 | 0 | 0 |
| 2 | COUNT | 0 | 0 | 0 | 1 | 0 | 0 | 0 | 1 | 0 | 0 |
| | B | 0 | 0 | 0 | 0 | 1 | 0 | 0 | 1 | 0 | 0 |
| 3 | COUNT | 0 | 0 | 0 | 0 | 0 | 1 | 0 | 1 | 0 | 0 |
| | B | 1 | 0 | 0 | 0 | 0 | 0 | 0 | 0 | 1 | 0 |
| 4 | COUNT | 0 | 1 | 0 | 0 | 0 | 0 | 0 | 0 | 0 | 1 |
| | B | 0 | 0 | 1 | 0 | 0 | 0 | 0 | 0 | 0 | 1 |
| 5 | COUNT | 0 | 0 | 0 | 1 | 0 | 0 | 0 | 0 | 0 | 1 |
| | B | 0 | 0 | 0 | 0 | 1 | 0 | 0 | 0 | 0 | 1 |
| 0 | COUNT | 0 | 0 | 0 | 0 | 0 | 1 | 0 | 0 | 0 | 1 |
| | B | 1 | 0 | 0 | 0 | 0 | 0 | 1 | 0 | 0 | 0 |

OUTPUT SIGNAL ON CONDUCTOR 57

Fig. 4

| COUNT | SHIFT PULSES | COUNTER 40 | | | | | | COUNTER 50 | | | |
|---|---|---|---|---|---|---|---|---|---|---|---|
| | | MAGNETIC CORE STORAGE ELEMENTS → | | | | | | | | | |
| | | $41_C$ | $42_B$ | $43_C$ | $44_B$ | $45_C$ | $46_B$ | 51 | 52 | 53 | 54 |
| 0 | B | 0 | 0 | 1 | 0 | 0 | 0 | 1 | 0 | 0 | 0 |
| 1 | COUNT | 0 | 0 | 0 | 1 | 0 | 0 | 1 | 0 | 0 | 0 |
| | B | 0 | 0 | 0 | 0 | 1 | | 1 | 0 | 0 | 0 |
| 2 | COUNT | 0 | 0 | 0 | 0 | 0 | 1 | 0 | 1 | 0 | 0 |
| | B | 1 | 0 | 0 | 0 | 0 | 0 | 0 | 0 | 1 | 0 |
| 3 | COUNT | 0 | 1 | 0 | 0 | 0 | 0 | 0 | 0 | 1 | 0 |
| | B | 0 | 0 | 1 | 0 | 0 | 0 | 0 | 0 | 1 | 0 |
| 4 | COUNT | 0 | 0 | 0 | 1 | 0 | 0 | 0 | 0 | 1 | 0 |
| | B | 0 | 0 | 0 | 0 | 1 | 0 | 0 | 0 | 1 | 0 |
| 0 | COUNT | 0 | 0 | 0 | 0 | 0 | 1 | 0 | 0 | 0 | 1 |
| | B | 0 | 0 | 1 | 0 | 0 | 0 | 1 | 0 | 0 | 0 |

OUTPUT SIGNAL ON CONDUCTOR 57

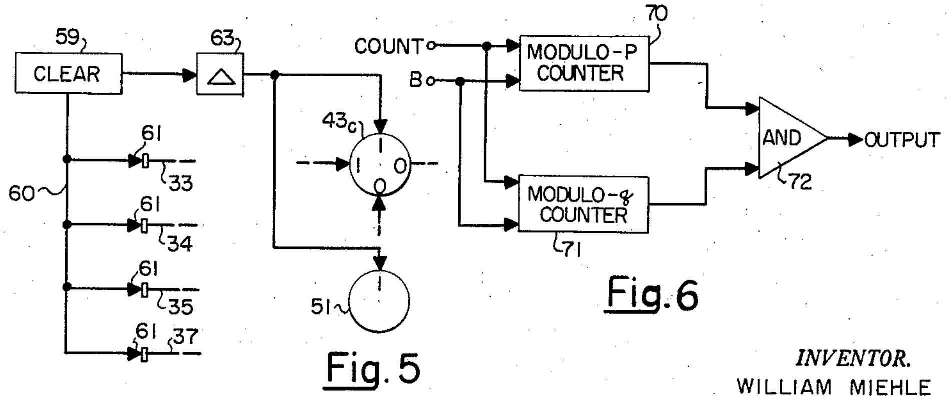

Fig. 5, Fig. 6

INVENTOR.
WILLIAM MIEHLE
BY Thomas B. Horton
AGENT

July 28, 1959 W. MIEHLE 2,896,848

MAGNETIC CORE SHIFT REGISTER COUNTER

Filed Oct. 8, 1954 2 Sheets-Sheet 2

INVENTOR.
WILLIAM MIEHLE
BY Thomas B. Horton
AGENT

United States Patent Office 2,896,848

Patented July 28, 1959

2,896,848

MAGNETIC CORE SHIFT REGISTER COUNTER

William Miehle, Havertown, Pa., assignor to Burroughs Corporation, Detroit, Mich., a corporation of Michigan Application October 8, 1954, Serial No. 461,246

21 Claims. (Cl. 235—167)

This invention relates to high-speed counters and more particularly to counters employing static magnetic elements.

Shift registers employing static magnetic elements for the storage of binary information are well known in the art as evidenced by articles such as "An Electronic Digital Computer" written by A. D. Booth and published in Electronic Engineering for December 1950. Many known counters have been devised which make use of the magnetic core shift register principles discussed therein. For example, in a known counter in order to count the number N, N pairs of static magnetic elements are connected in a ring. Each pair of elements comprises a count element and an intermediate storage element, and count signals and shift signals are applied alternately to all of the count elements and to all of the intermediate storage elements, respectively, to advance a reference bit signal along the ring. This circuit uses two magnetic elements per count and is expensive with respect to the number of static magnetic elements needed.

Evidently a circuit which substantially lessens the number of cores required to count a number N represents a step forward in the art. In accordance with this invention means are provided for combining a plurality of magnetic core shift registers in a manner which results in a considerable economy with respect to the number of cores required to count a number N. In one embodiment, for example, in order to count 49 only 28 static magnetic cores are required as compared to the 98 which would be required in a straight ring counter.

It is a general object of this invention to further the art of using static magnetic elements.

It is a specific object of this invention to provide an improved high-speed counter.

Finally, it is a further object of this invention to provide a high-speed magnetic core shift register counter which is economical with respect to the number of cores required.

According to the invention a first group and a second group of static bistable-state magnetic elements each having input, output, and shift circuits are connected to pass information signals around first and second closed loops. Coupling means are provided which interconnect an output element of the first group with shift elements of the second group. Finally an output signal which is a product of the inter-relationship between the two groups is derived from at least one of the magnetic elements of the second group.

Other objects and advantages will become apparent when viewed in the light of the accompanying drawings, of which:

Fig. 1 is a logical diagram of a magnetic core shift register counter constructed according to the invention;

Fig. 2 is a chart illustrating the logical operation of the counter of Fig. 1;

Fig. 4 is a chart illustrating the logical operation of the counter of Fig. 3;

Fig. 5 is a logical diagram of resetting means for the counter of Fig. 3;

Fig. 6 is a further embodiment of a counter constructed according to the invention;

Figure 7A:
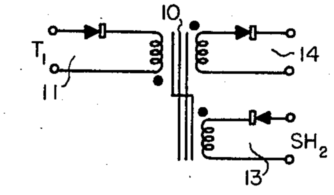
Figure 7B:
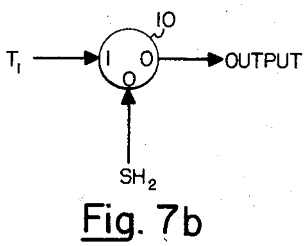
Figure 8A:
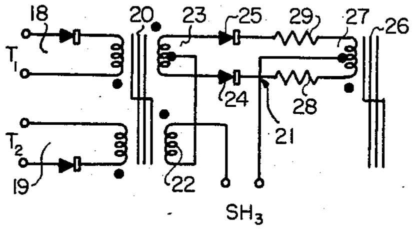
Figure 8B:
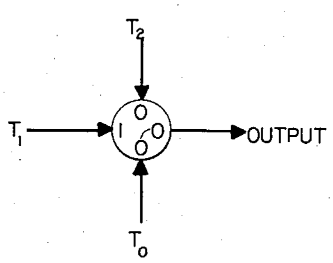

Fig. 7*a* is a schematic drawing of a magnetic storage element used in the present invention;

Fig. 7*b* is a logical diagram of the magnetic storage element of Fig. 7*a*;

Fig. 8*a* is a schematic diagram of a conditional transfer circuit for magnetic storage elements as used with the present invention; and Fig. 8*b* is a logical diagram of the conditional transfer circuit of Fig. 8*a*.

Before entering into a detailed description of the invention, the logical notation utilized to represent magnetic core storage elements in the schematic circuit embodiments of the invention will first be explained.

Referring to Fig. 7*a* there is shown a schematic diagram of one of the magnetic core storage elements which are utilized as basic components of the invention. A magnetic core 10 is schematically drawn to represent a material having a rectangular hysteresis characteristic, having the capability of being shifted from one to the other of two stable storage states, and having the propensity of remaining in the state to which it is shifted. About the core 10 are several transformer windings 11, 13, and 14 each having a series diode associated therewith to indicate the direction of current flow through the respective windings. In this particular embodiment of the storage element, winding 11 is employed for the input of signals, winding 13 provides the shift means, and winding 14 is the output signal means. When the core is operated with input direct signal pulses of a single polarity, the diodes need not be used in input windings 11 and 13. The diode in output winding 14 is used to permit an output current only when the storage element is switched from one storage condition such as "1" to the opposite storage condition "0." At each of the windings the dot notation is used to indicate the direction of flux established in the windings by current flow from an external source. Thus, if current flows into the end of the winding at which the dot is located, it will provide the remanent condition in the storage element which may arbitrarily be designated as the "0" remanence state. Conversely, if current flows into an undotted end of the winding, it will establish the opposite remanence condition "1."

Information is supplied to input winding 11 in the form of signals $T_1$ of the on-off binary type which produce current flow for establishing the condition "1" only. With the core initially in its "0" condition, application of a binary one effects current flow in winding 11, and core 10 is saturated to its "1" condition. With the core initially in the "1" condition the application of a binary one again effects current flow in winding 11; however the core is already in its "1" state, and no change in binary state occurs. Finally with the core initially in either the "1" or the "0" state, application of a binary zero produces no current flow in winding 11; and therefore there is no change in the binary storage state.

In order to read out the information which is stored as one or the other of two binary magnetic states in core 10, a shift pulse signal $SH_2$ is applied to shift winding 13 to drive the core to its zero state. If, at the time the signal $SH_2$ is applied, said core is in its "1" state, a large flux change occurs when the core switches from "1" to "0"; and in response thereto, a large output signal is produced in output winding 14. If, however, the core is already in its "0" condition at shift pulse time, no appreciable flux change occurs, and no output signal is forthcoming from winding 14. Summarizing, when a core is interrogated by the shift pulse a stored binary one produces an output signal, and a binary zero produces no output signal. The subscripts associated with the signals $T_1$ and $SH_2$ conveniently indicate the relative order in which said signals occur.

Fig. 7*b* illustrates the logical notation which is used hereinafter to represent a magnetic core storage element in order to simplify the description of the invention. Each static magnetic core element is designated by a circle 10 with input and output leads being designated respectively by arrows entering and leaving the circle. The storage states into which the input pulses drive the core 10 are designated by the binary notation at the end of the input leads. In similar manner the binary notation at the output lead indicates that an output signal will occur when the state of the core is changed from the opposite binary state to that indicated.

In certain instances described hereinafter it is desired to perform logical manipulations within a magnetic storage element without producing a signal for transfer from the output circuit thereof. For example, it may be desired to drive a core containing a "1" to its "0" state without producing an output signal. Under these circumstances a conditional transfer circuit of sort shown by Fig. 8*a* may be utilized. With this circuit, changes of state of the core 20 may cause a pulse to be transferred to succeeding core 26 only upon condition that the shift current pulse $SH_3$ is present. This type of conditional transfer is fully described in the copending application of John O. Paivinen, Serial No. 420,135, filed March 31, 1954, entitled "Magnetic Device." However, the ensuing description will enable those skilled in the art to utilize the conditional transfer circuit with the present invention.

Conditional transfer is effected by means of the split winding transfer loop 21. Operation of the conditional transfer loop 21 is initially dependent upon current flow in the interrogation winding 22 which returns core 20 to its "0" state in a conventional manner to thereby product a large signal voltage in the split output winding 23. Because of the presence of the output signal pulse upon switching of core 20, the lower diode 24 in the transfer loop has less than half the total current flowing therethrough, thus causing the shift current to flow almost entirely through the upper half of the split winding and through the upper section of the input winding 27 upon the receiving core 26. The current flow through the upper diode 25 which is in excess of that through diode 24 will cause a resultant saturating flux to be induced by winding 27 upon core 26, which places the core in the "1" storage condition thereby effecting a transfer of the stored "1" from core 20 to core 26. Conversely, when a "0" is stored in core 20, little potential will result in winding 23, and the shift current will therefore divide evenly in the two sections of the transfer loop 21 causing equal and opposite flux to be induced in the two halves of winding 27 upon core 26 which leave the storage of said core undisturbed. By the inclusion of current limiting resistors 28 and 29 current balance is retained during the latter operation thereby limiting the noise or partial switching which otherwise might be produced during transfer of a "0" from core 20 to core 26 by a small amount of current unbalance.

Switching of core 20 by other means than current flow through winding 22 will cause a potential to be induced in the split winding 23. However, diodes 24 and 25 prevent current flow in the winding 27, and core 26 sees no noise or spurious output. For example, if core 20 were set to the "1" state by a signal $T_1$ applied through input winding 18 and reset to "0" by a signal $T_2$ applied to a second input winding 19, no information signals would be transferred to core 26 by these manipulations.

The logical notation for conditional transfer circuits of this type is shown in Fig. 8*b* wherein the eyebrow connection between the shift and output windings indicates that an output signal pulse is produced for transfer only in response to a shift pulse; otherwise the notation is the same as that described hereinbefore.

Referring to Fig. 1 a modulo *n* counter constructed according to the invention is comprised of a pair of cascaded magnetic core shift registers 40 and 50 which are utilized as a modulo-*p* and as a modulo-*q* counter respectively where *n* equals the product of *p* and *q*. Each of the shift registers 40 and 50 comprises an even numbered plurality of bi-stable magnetic core storage elements (two cores per count) arranged in a closed ring around which a single binary bit signal is circulated and indicates the count by its position in the ring. Circulation of the reference bit signal in the second shift register 50 is controlled by output signals of the first shift register 40 in a manner such that the second shift register 50 functions to record the number of complete cycles the reference bit undergoes in shift register 40. For the purpose of simplifying the disclosure of the invention it is to be presumed that a modulo-six counter is required; whereupon shift register 40 is utilized as a modulo-three counter, and shift register 50 is utilized as a modulo-two counter.

First counter 40 comprises six bi-stable magnetic core storage elements $41_C$, $42_B$, $43_C$, $44_B$, $45_C$ and $46_B$ each of which has its output circuit connected to the input circuit of the following storage element in a closed ring arrangement. The shift circuits of first storage element $41_C$, third storage element $43_C$, and the fifth storage element $45_C$ are commonly connected via conductor 33 to a source 31 of input signals to be counted. In a similar manner the second storage element $42_B$, fourth storage element $44_B$, and sixth storage element $46_B$ are commonly connected via conductor 34 to a source 32 of B pulses which are shift signals occurring alternately with the pulses to be counted.

Second counter 50 comprises four bi-stable magnetic core storage elements $51_C$, 52, $53_C$ and 54 each of which has its output circuit connected to the input circuit of the following storage element in a closed ring arrangement. In identical manner with counter 40, the shift circuit of first storage element $51_C$ and third storage element $53_C$ are commonly connected via line 33 to the source 31 of input pulses to be counted. However, the shift circuits of second storage element 52 and fourth storage element 54 are commonly connected via conductor 35 for control by signals produced in the output circuit of the last storage element $46_B$ of first counter 40. Finally, a counter output conductor 57 is projected from the output circuit of the last storage element 54 of counter 50.

For convenience, the reference characters of those storage elements whose shift windings are driven by the count pulses bear a subscript C. Similarly the storage elements whose shift windings are controlled by the B pulses have the subscript B associated with their identifying reference character.

In tracing through a complete cycle of operation of the cascaded counters 40 and 50, consider the chart of Fig. 2 which illustrates the binary states of the core elements of said counters in response to the application thereto of both the alternate count pulses and B pulses. Initially the cascaded counters display a zero count condition which is designated by the presence of a reference bit, binary "1," in both the first storage element $41_C$ of counter 40 and the first storage element $51_C$ of counter 50 and by the presence of a binary "0" in all of the other storage elements. Upon application of the first count pulse to conductor 33 the shift circuits of all of the cores bearing a subscript C are energized. In response thereto cores $41_C$ and $51_C$ which are in the "1" state are driven to their "0" states, and produce signals in their output windings which effect setting of the cores $42_B$ and 52 to their "1" states. Those cores which are already in the "0" condition when the count pulse is applied to their shift windings merely retain their "0" states. Subsequent to the first count pulse a B pulse occurs which energizes the shift circuits of all cores of counter 40 bearing the subscript B. Thus, in counter 40 the B pulse effects shifting of the reference bit "1" from core $42_B$ to core $43_C$. In response to subsequent alternating count and B pulses the reference bit is shifted across the elements of counter 40 until following the third count pulse it is located in core $46_B$. While the reference bit of counter 40 is being so shifted the reference bit of counter 50 remains in core 52 which is not affected by either the count or the B pulses. In response to the B pulse which follows the third count pulse, the storage element $46_B$ is restored from its "1" state to its "0" state, and a signal is produced in the output circuit thereof which effects reinsertion of the reference bit in core $41_C$ and energization of the shift windings of cores 52 and 54 of counter 50. Energization of the shift winding of core 52 effects transfer of the reference bit "1" to core $53_C$. The fourth count pulse effects transfer of the reference bits of counters 40 and 50 to cores $42_B$ and 54 respectively. Subsequent B and count pulses once more effect shifting of the reference bit of counter 40 across the storage elements until the sixth count pulse places it in core $46_B$. The B pulse following the sixth count pulse effects shifting of the "1" from core $46_B$ to core $41_C$ of counter 40 and effects energization of the shift circuits of elements 52 and 54. Finally, energization of the shift circuit of element 54 effects restoration of said element from a "1" to a "0" condition to produce an output signal therefrom which is fed back to effect reinsertion of the "1" in first core $51_C$ and which is used as the cascaded-counter output signal upon conductor 57 to indicate a six count.

If desired, the output circuit of any magnetic core storage element of counter 40 except the last storage element $46_B$ may be used to energize the shift windings of elements $51_C$ and $53_C$ of counter 50 in place of the count pulses.

The cascaded shift register counter described hereinabove finds practical application only when the number N, which it is desired to count, is divisible into equal or nearly equal factors. If the number N is a prime number or is not divisible into nearly equal factors a different technique may be used. By utilizing the output signal of the second counter to preset or short count the first counter, counts which are less than the least common multiple of the modulo counts of the two counters may be obtained. For example, in order to count 46 two modulo seven counters may be cascaded. Ordinarily the cascaded modulo-7 counters operate as a modulo-49 counter, however, by utilizing the cascaded-counter output signals to enter a three into the register initially, the cascaded-counters count between 3 and 49 and thereby produce an output signal for every 46 pulses counted.

Figure 3:
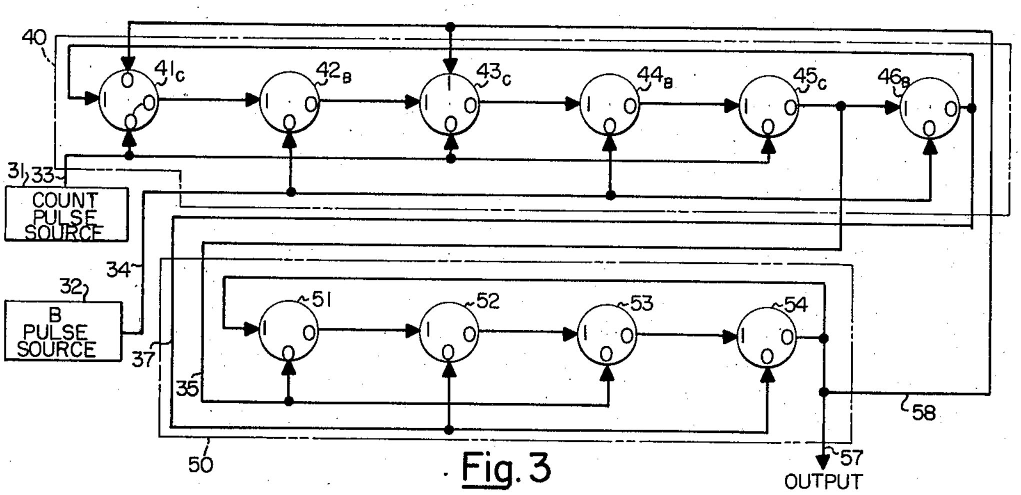
Fig. 3 is a modified version of the counter of Fig. 1.

Referring to Fig. 3 the cascaded counters 40 and 50 of Fig. 2 have been modified to operate as modulo-5 counter rather than as a modulo-6 counter. For convenience, the same reference characters that are used in Fig. 1 are used for the like elements of Fig. 3. Note however that the magnetic core storage elements $41_C$ and $42_B$ of Fig. 3 are linked by a conditional transfer circuit whereby only the application of a count pulse to the shift winding of magnetic storage element 41 is effective to transfer a "1" from element $41_C$ to element $42_B$. Note, also, that feedback conductor 58 has been added to apply the cascaded-counter output signal to auxiliary windings of elements $41_C$ and $43_C$ whereby element $41_C$ is reset to a "0" condition and element $43_C$ is set to a "1" condition. Further, instead of utilizing the count pulses to energize the shift windings of elements 51 and 53, signals produced in the output circuit of the next-to-last element $45_C$ of register 40 are applied to said shift windings via conductor 37.

In tracing through the operation of the cascaded counters of Fig. 3, refer to the chart of Fig. 4 which shows the binary condition of each core for each count. Basically the operation of the modulo-5 counter differs only slightly from the modulo-6 counter. The zero count condition is defined by the presence of a reference bit in storage element $43_C$ of counter 40 and a reference bit in storage element 51 of counter 50. The first count pulse and the first B pulse effect transferral of the reference bit of counter 40 from storage element $43_C$ through storage element $44_B$ to storage element $45_C$. The second count pulse causes transferral of the counter 40 reference bit from storage element $45_C$ to last storage element $46_B$, and in so doing causes transmission of a shift signal from the output circuit of magnetic storage element $45_C$ to the shift windings of storage elements 51 and 53 of counter 50 thereby to transfer the reference bit of counter 50 from storage element 51 to storage element 52. In response to the second B pulse the reference bit of counter 40 is removed from storage element $46_B$ and reinserted into storage element $41_C$. However, when the reference bit is transferred out of element $46_B$, a signal is generated in its output circuit which is used to energize the shift windings of the storage elements 52 and 54 of counter 50; and the reference bit of said counter 50 is transferred thereby from storage element 52 to storage element 53. The third and fourth count and B pulses effect transferral of the counter 40 reference bit from element $41_C$ through the intervening elements to element $45_C$. Following sequentially, the fifth count pulse shifts the reference bit from element $45_C$ to element $46_B$ and in so doing generates a shift signal to elements 51 and 53 of counter 50 to cause transfer of the reference bit of the latter to element 54. Finally, the fifth B pulse causes transfer of the reference bit of counter 40 from last element $46_B$ to first element $41_C$ and thereby causes a shift signal to be applied to elements 52 and 54 of counter 50. The shift signal transfers the reference bit of counter 50 from element 54 to element 51 thereby producing the cascaded-counter output signal on counter output conductor 57 to indicate a five count. By means of feedback conductor 58 the output signal is used to energize auxiliary windings of elements $41_C$ and $43_C$ to drive them to a "0" condition and a "1" condition respectively. Thus, the counter is completely restored to its zero count state and is readied to count another series of five pulses. If necessary, power amplifier means may be used in any circuit lead where the elements themselves do not provide enough output energy to cause shifting of a series of cores, or the like.

In order to initially condition or clear the cascaded shift registers counters, that is, to reset the counter to indicate a zero count condition, resetting means of the sort disclosed by Fig. 5 may be used. For convenience only those portions of the counter which are necessary to an understanding of the resetting means have been illustrated and bear the same reference characters as in Fig. 3. A clear signal generator 59 is connected via lead 60, diodes 61, and conductors 33, 34, 35 and 37 to the shift circuits of all of the storage elements of counters 40 and 50. Said clear signal generator 59 is also connected through a delay circuit 63 to auxiliary input windings of both magnetic storage elements $43_C$ and 51. In order to initially condition the counter, clear signal generator 59 is operated to apply a clear pulse to the shift windings of all of the storage elements and thereby restore all the cores simultaneously to a "0" state. Delay circuit 63 delays the application of the clear signal to storage elements $43_C$ and 51 until the rest of the circuit has been completely restored to its zero indicating status whereupon said delayed clear signal accomplishes the setting of elements $43_C$ and 51 to their "1" condition. Thus, the elements of counters 40 and 50 will display the zero conditions set forth in the chart of Fig. 4. In order to apply this clear circuit to the counter of Fig. 1 the delayed clear pulse would be applied to storage element $41_C$ instead of storage element $43_C$ of counter 40 and the connection to conductor 37 would be eliminated.

An alternate arrangement for combining a modulo-*p* counter and a modulo-$q$ counter to obtain a count N which is the product of $p$ and $q$ is illustrated by Fig. 6. A pair of counters 70 and 71 each of which is a magnetic core shift register of the same sort as counter 40 of Fig. 1 are both operated by count and B pulses. The output conductors of both counters are connected to the inputs of an "and," or coincidence, circuit 72. Counter 70 is a modulo-$p$ counter and counter 71 is a modulo-$q$ counter. In order for "and" circuit 72 to produce an output signal, coincident input signals are required. Coincident output signals are produced from the two counters only for the count equal to the least common multiple of the modulo counts $p$ and $q$. If desired, more than two counters might be so combined to obtain other least common multiples.

It should be understood that many modifications and variations of the above disclosed invention will occur to those skilled in the art which, however, will fall within the spirit and scope of this invention. Certain features which are believed to be indicative of the nature and scope of this invention are described with particularity in the appended claims.

What is claimed is:

1. A pulse counter comprising the combination of a first group of static bistable-state magnetic elements having input, output, and shift windings and connected to pass information signals around a first closed loop, a second group of bistable-state magnetic elements having input, output, and shift windings and connected to pass information signals around a second closed loop, means for entering at least one reference signal into at least one of the elements of the first group, means responsive to the pulses to be counted for effecting circulation of the reference signal around the closed loop of said first group, means for entering at least one reference signal into at least one element of the second group, means responsive to the recurrent presence of the reference signal in one of the elements of the first group for advancing the reference signal of the second group from one element to another element thereof, and means responsive to the presence of a reference signal in one of said second group elements to produce an output signal.

2. The combination according to claim 1 wherein the means for effecting circulation of the reference signal in said first group comprises a source of input signals to be counted, a source of shift signals which occur alternately with the input signals, means connecting the shift windings of alternate elements of the first group with the source of input signals, and means connecting the shift windings of the other alternate elements of the first group with the source of shift signals.

3. The combination according to claim 1 wherein the means for advancing the reference signal in the second group comprises circuit connections between the output windings of at least one element of the first group and the shift windings of elements of the second group.

4. The combination according to claim 1 including means for feeding back the output signal to windings of one or more of the elements to effect setting to a particular state.

5. A counter comprising the combination of a first group of static bistable-state magnetic elements having input, output, and shift windings and connected to pass information signals around a first closed loop, a second group of static bistable-state magnetic elements having input, output, and shift windings and connected to pass information signals around a second closed loop, means for entering at least one reference signal into at least one of the elements of the first group, a source of input signals to be counted, a source of shift signals which occur alternately with said input signals, means connecting the shift windings of alternate elements of the first group with the input signal source, means connecting the shift windings of the other alternate elements of said first group with the shift signal source, means for entering at least one reference signal into at least one element of the second group, circuit connections between the output windings of at least one element of the first group and the shift windings of elements of the second group, and means responsive to the presence of the reference bit in one or more elements for producing an output signal.

6. A counter comprising first and second shift registers, each of said shift registers comprising a plurality of static bistable-state magnetic storage elements each having input, output, and shift circuits and each of which has its output circuit connected to the input circuit of the following element in a closed ring arrangement, a source of input pulses to be counted coupled to the shift circuits of alternate elements beginning with the first elements of both the first and second shift registers, a source of shift pulses which occur alternately with said input pulses and which is commonly connected to the shift circuits of alternate elements of the first shift register beginning with the second element thereof, means coupling the output circuit of at least one of the elements of the first shift register with the second element and alternate elements thereafter of the second shift register, and means for deriving an output signal from the output circuit of at least one of the elements of the second register.

7. The combination in accordance with claim 6 and including means coupling said second register output circuit with an input circuit of at least one of the elements of the first shift register.

8. The combination according to claim 6 and including means for entering a reference signal into one of the elements of the first shift register and one of the elements of the second shift register.

9. A counter comprising the combination of a first shift register comprised of a first even-numbered plurality of static magnetic storage elements each having input, output, and shift circuits associated therewith, each storage element having its output circuit connected to the input circuit of the following storage element in a closed ring arrangement, a source of input signals commonly coupled with the shift circuits of alternate storage elements of the first shift register including one element which may be considered as the first storage element thereof, a source of shift pulses which occur alternately with the input signals and which is commonly coupled with the shift circuits of alternate storage elements of said first shift register including the second storage element thereof, a second shift register comprised of a second even-numbered plurality of static magnetic storage elements each having input, output, and shift circuits associated therewith and each having its output circuit connected to the input circuit of the following storage element in a closed ring arrangement, means commonly coupling the output circuit of the last storage element of the first shift register with the shift circuit of alternate storage elements of the second shift register including the last element thereof, means commonly coupling the output circuit of one of the storage elements of the first shift register other than the last storage element thereof with the shift circuits of alternate storage elements of the second shift register including the first storage element thereof, and means for deriving an output signal from the output circuit of the last storage element of the second shift register.

10. The combination in accordance with claim 9 including means for coupling the output circuit of the last storage element of the second shift register with the input circuits of at least one of the storage elements of the first shift register.

11. The combination according to claim 10 and including means for entering a reference signal into one of the storage elements of first shift register and one of the storage elements of the second shift register.

12. In combination, a first group of static bistable-state magnetic elements each having at least input, output and shift windings and connected to pass information signals around a first closed loop in response to alternate actuation of different groups of shift windings; a second group of similar magnetic elements each having at least input, output and shift windings and connected to pass information signals around a second closed loop; means interconnecting an output winding of an element of said first group with a group of shift windings of elements of said second group; and means for deriving an output signal from an output winding of one of said second-loop elements.

13. In combination, a group of static bistable-state magnetic elements each having input, output, and shift windings and connected to pass information signals around a closed loop; at least two static bistable-state magnetic elements external to said group and having shift windings; means for entering a reference signal in one of said elements of said group and also in one of said external elements; an output circuit connected to the output winding of at least one element of said group; means interconnecting said output circuit with the shift windings of one of said external elements; and means for deriving an output signal from one of said external elements.

14. A pulse counter comprising: first and second groups of static bistable-state magnetic cores each having input, output, and shift windings, said cores being connected to form first and second continuous rings, one core of each ring being in one of the stable states, the other cores being in the other state; means for applying external pulses to the shift windings of said first-ring cores to transfer the said one stable state from core to core around the ring; means for deriving output pulses from an output winding of one of said first-ring cores in response to said core changing from said one state to the other; means for applying some of said external pulses to the shift windings of some of said second-ring cores; means for applying said derived first-ring output pulses to the shift windings of other of said second-ring cores to effect, in response to said derived pulses and said external pulses, the transfer of said one state from core to core around said second ring; and means for deriving output pulses from an output winding of a second-ring core.

15. A pulse counting system comprising: a first continuous ring of a first number of static bistable-state magnetic cores; a second continuous ring of a second number of static bistable-state magnetic cores; means for placing one of said first-ring cores in one of the stable states and the other first-ring cores in said other state; means for placing one of said second-ring cores in said one state and the other second-ring cores in said other state; means for applying pulses to be counted to said first-ring to advance the said one state from said one core to the other first-ring cores in succession; means responsive to the presence of the said one state at one of said other first-ring cores for deriving an output pulse; means for applying said derived output pulse to one of the cores of said second ring to advance the one state from that core to another; and means for deriving an output signal from said second ring.

16. A pulse counter comprising: a first continuous ring of a first number of static bistable-state magnetic cores each having input, output, and shift windings; a second continuous ring of a second number of static bistable-state magnetic cores each having input, output, and shift windings, said first and second numbers being different integers; means for placing one of said first-ring cores in one of the stable states and the other first-ring cores in the other state; means for placing one of said second-ring cores in said one of the states and the other second-ring cores in said other state; means for applying pulses to be counted to shift windings of said first ring to advance the said one state from one core to the other first-ring cores in succession; means interconnecting the output winding of one of said other first-ring cores to the shift winding of one of the cores of said second ring and responsive to said last-mentioned other first-ring core acquiring said one state for applying a signal from said first ring to said second ring to advance the said one state from said interconnected second-ring core to another; and means for deriving output pulses from said second ring.

17. A pulse counter comprising: first and second groups of static bistable-state magnetic cores each having input, output, and shift windings; means connecting the input and output windings of said first-group cores to form a first continuous ring; means connecting the input and output windings of said second-group core to form a second continuous ring, the number of cores in said first ring being different from that in said second ring; means for placing one of said first-ring cores in one of the stable states and the other first-ring cores in the other state; means for placing one of said second-ring cores in said one state and the other second-ring cores in said other state; means for applying external pulses to the shift windings of said first-ring cores to shift said one state from one first-ring core to the next in succession; means for applying some of said external pulses to the shift windings of some of said second-ring cores; and means, responsive to a change in core state from said one to said other state, for deriving pulses from the output winding of one of said first-ring cores and for applying the same to the shift windings of one of said second-ring cores to shift, in response to said external pulses and said derived pulses, the said one state from one second-ring core to another in succession; and means for deriving output pulses from the output winding of one of said second-ring cores.

18. A counter for electrical pulses comprising: first and second groups of static bistable-state magnetic cores each having input, output, and shift windings; means for connecting input and output windings of different cores of said first group to form a first continuous ring; means for connecting input and output windings of different cores of said second group to form a second continuous ring; means for initially placing one of said first-ring cores in one of the stable states and the other first-ring cores in the other state; means for initially placing one of said second-ring cores in said one state and the other second-ring cores in said other state; a source of external pulses comprising pulses to be counted and pulses whose time of occurrence is intermediate that of said pulses to be counted; means for applying said pulses to be counted to the shift windings of alternate cores of said first ring; means for applying said intermediate pulses to the shift windings of the other alternate cores of said first ring; means for deriving a first and a second output pulse respectively from each of two adjacent ones of the first-ring cores in response to a change of the respective core from said one state to said other state; means for applying said first-ring first output pulse to the shift winding of alternate second-ring cores and said first-ring second output pulse to the shift windings of the other alternate second ring cores; and means for deriving output pulses from the output windings of one of said second ring cores.

19. Apparatus as claimed in claim 18 characterized in that two of the cores of said first ring, including said core which is initially placed in said one state, are equipped with additional input means, and further characterized in that means are provided for applying the output pulses derived from the second-ring core to the said additional input means to effect setting of one of the last mentioned two cores in said one state and the other in said other state.

20. Apparatus as claimed in claim 19 characterized in that the additional input means of said core which is initially placed in said one state is so arranged that in response to said output pulse from said second-ring core setting of said core in said other state is effected.

21. An electronic counting device for producing one pulse for each $n$ pulses to be counted, said device comprising: first and second groups of static bistable-state magnetic cores each having input, output, and shift windings, said first group comprising two times $p$ cores and said second group comprising two times $q$ cores where the product $pq$ equals $n$; means connecting the output and input windings of said first-group cores to form a first continuous ring; means connecting the input and output coils of said second-group cores to form a second continuous ring; means for initially placing one of said cores of said first ring in one of the stable states and the other first-ring cores in the other state; means for initially placing one of said cores of said second ring in said one state and the other second-ring cores in said other state; a source of external pulses comprising pulses to be counted and pulses occurring intermediate the time of occurrence of the to-be-counted pulses; means for applying said pulses to be counted to the shift windings of alternate first-ring cores; means for applying said intermediate pulses to the shift windings of the other alternate first-ring cores; means for applying said pulses to be counted to the shift windings of one-half the total number of cores in said second ring; means for deriving pulses from the output windings of one of the first-ring cores; means for applying said derived pulses to the shift windings of the other one-half of said second-ring cores; and means for deriving output pulses from the output winding of one of the second ring cores.

References Cited in the file of this patent

UNITED STATES PATENTS

| | | |
|---|---|---|
| 2,563,106 | Eugley et al. | Apr. 28, 1948 |
| 2,640,164 | Giel et al. | May 26, 1953 |
| 2,652,501 | Wilson | Sept. 15, 1953 |
| 2,654,080 | Browne | Sept. 29, 1953 |
| 2,697,178 | Isborn | Dec. 14, 1954 |
| 2,710,952 | Steagall | June 14, 1955 |